United States Patent [19]

Hashida

[11] Patent Number: 5,002,344
[45] Date of Patent: Mar. 26, 1991

[54] FLUID PRESSURE CONTROLLER FOR ANTILOCK BRAKE CONTROL DEVICE

[75] Inventor: Koichi Hashida, Itami, Japan
[73] Assignee: Sumitomo Electric Industries, Ltd., Osaka, Japan
[21] Appl. No.: 388,837
[22] Filed: Aug. 3, 1989

[30] Foreign Application Priority Data

Aug. 4, 1988 [JP] Japan ................................. 63-196399

[51] Int. Cl.[5] .............................................. B60T 8/42
[52] U.S. Cl. ........................................ 303/117; 303/92
[58] Field of Search ................... 303/92, 113, 115, 117

[56] References Cited

U.S. PATENT DOCUMENTS 3,851,930 12/1974 Grosseau ............................. 303/117
4,715,666 12/1987 Farr ................................. 303/117 X

*Primary Examiner*—Duane A. Reger
*Attorney, Agent, or Firm*—Wenderoth, Lind & Ponack

[57] ABSTRACT

A fluid pressure control device for antilock control includes a housing having inlet and outlet ports communicating with a master cylinder and a wheel brake, respectively, and a spool mounted in the housing so as to be slidable between two positions. When the spool is in one of the two positions, a large-flow channel is formed between the inlet and outlet ports, whereas in the other position, a small-flow channel is formed therebetween. When in an intermediate positon, both the large-flow and small-flow channels are closed. A bypass channel branches off from the small-flow channel so as to extend to the outlet port. A check valve is provided in this channel. Even if the spool should get stuck and immovable at an intermediate position between the above two positions, hydraulic oil can be fed from the inlet port to the outlet port through this bypass channel.

2 Claims, 4 Drawing Sheets

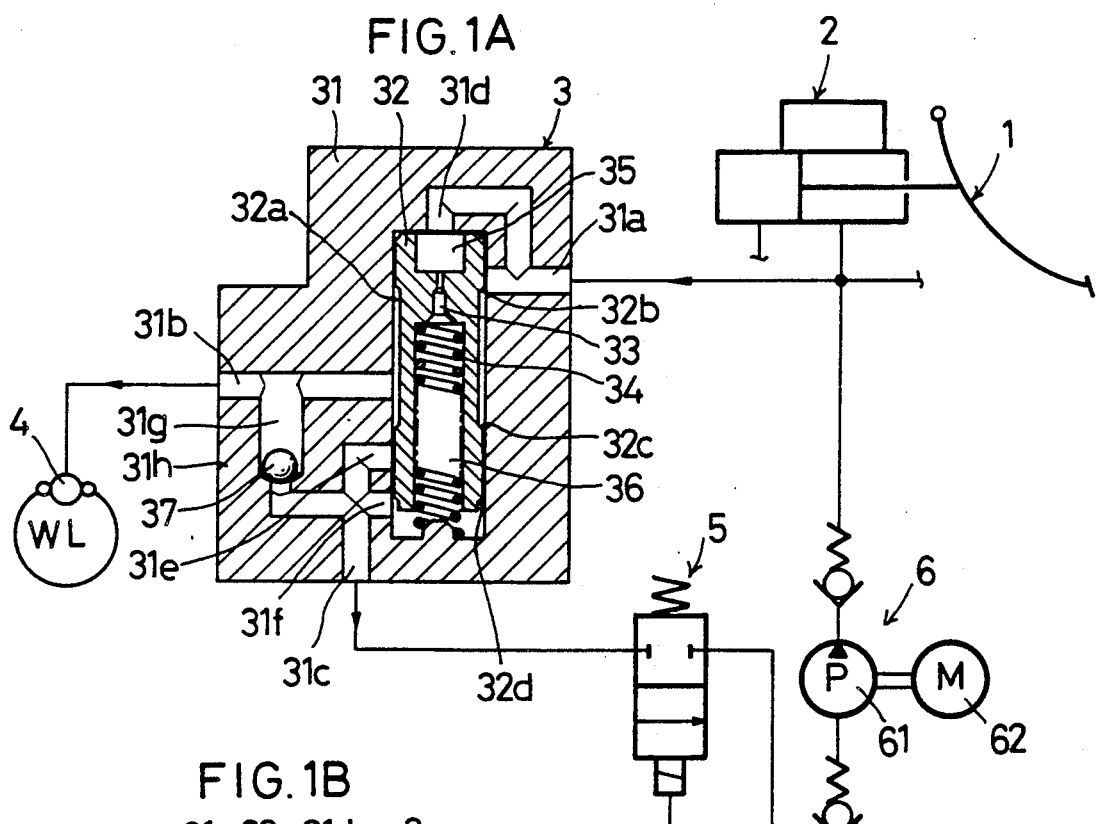
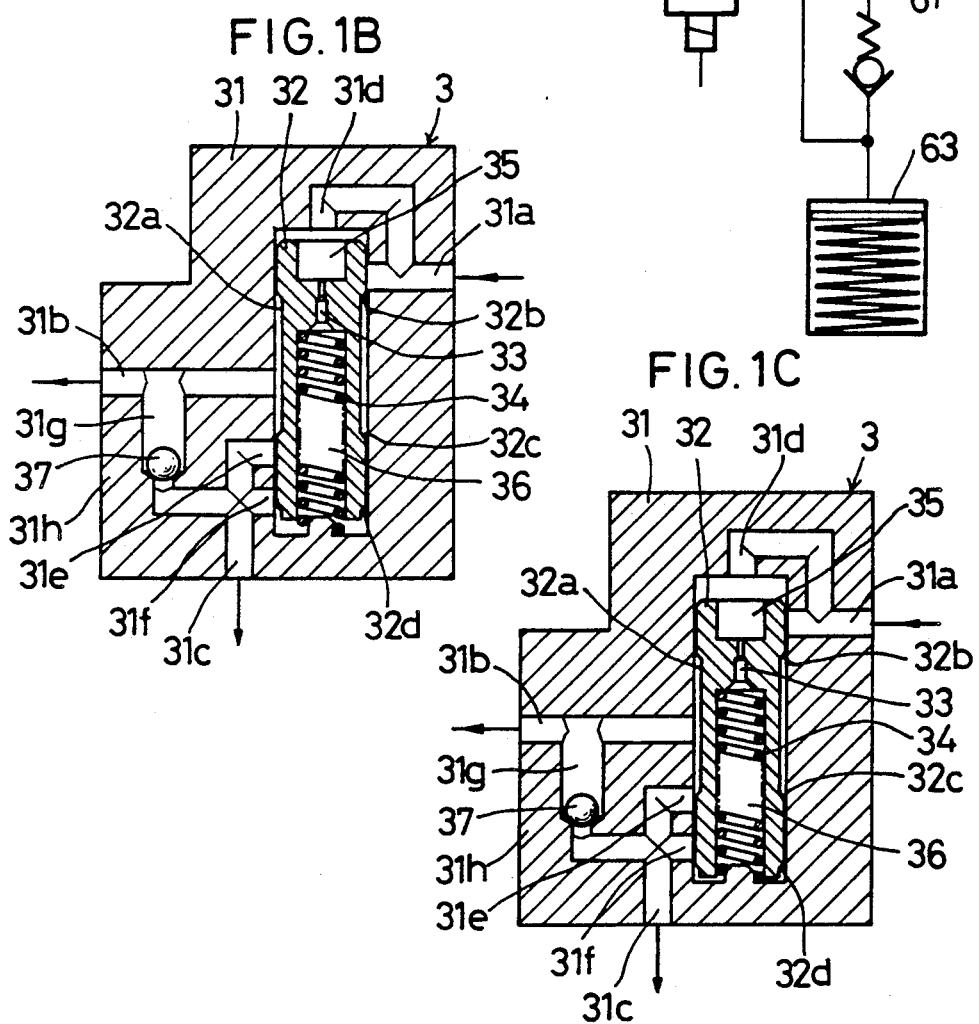

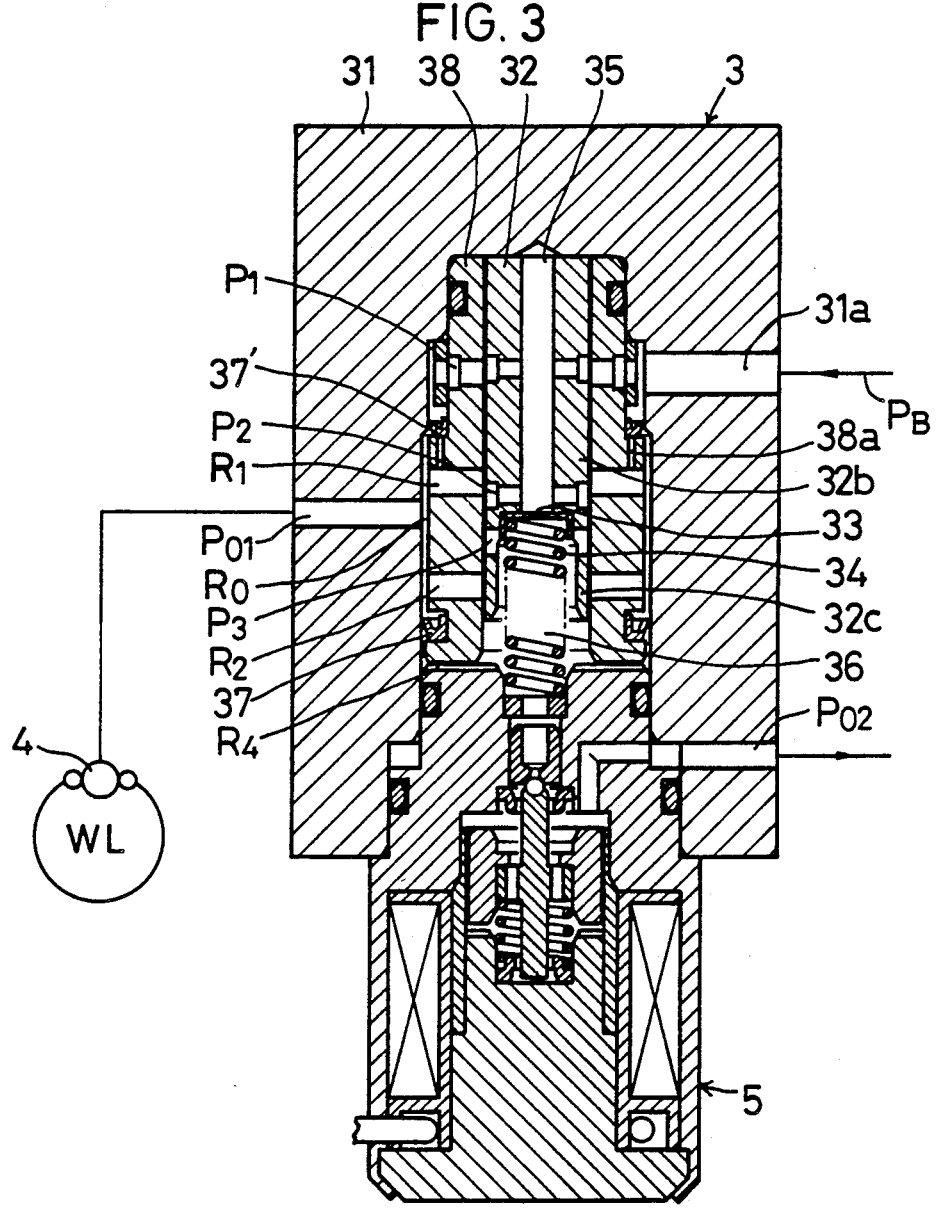

FLUID PRESSURE CONTROLLER FOR ANTILOCK BRAKE CONTROL DEVICE

The present invention relates to a fluid pressure controller for use in an antilock brake control device for a motor vehicle and having a flow changeover valve for controlling the braking pressure. Background Of The Invention With the spread of antilock brake control devices for motor vehicles, it is becoming an urgent requirement to develop an antilock control device applicable to a compact economy car. To meet this requirement, it was proposed in GB 8512610 to use a single solenoid valve for each vehicle wheel and control with two control modes, i.e. pressure reduction and pressure increase, instead of using two solenoid valves for each vehicle wheel as disclosed in Japanese Examined Patent Publication 49-28307.

The device disclosed in the latter Publication is shown in FIGS. 4A, 4B and 4C in which a flow changeover valve 3 is employed to increase the braking pressure in a controlled manner in place of a solenoid valve as used in the former Publication. This flow changeover valve 3 comprises a housing 31 formed with an inlet port 31a communicating with a master cylinder 2, an outlet port 31b communicating with a wheel brake 4 and a discharge port 31c communicating with a solenoid valve 5 serving as a discharge valve, and a spool 32 slidably mounted in the housing 31 and biased by a spring 34 to open and close fluid communication among these ports.

When the valve 3 is in its original position shown in FIG. 4A, where the antilock control is not in action, a large-flow channel is formed extending from the inlet port 31a to the outlet port 31b through a peripheral groove 32a formed in the outer periphery of the spool 32. When the solenoid valve 5 is energized and opened in the antilock control, hydraulic oil will be discharged through the discharge port 31c into a reservoir 63. This will move the spool 32 to the position shown in FIG. 4B owing to a difference of pressures on both ends thereof. In this state, the abovementioned large-flow channel is closed by an edge 32b on the spool 32.

The spool 32 will further move to the position shown in FIG. 4C where part of the peripheral groove 32a at the side of an edge 32c opens to a passageway 31e. Thus a discharge channel is formed from the outlet port 31b to the discharge port 31c through the groove 32a and the passageway 31e, allowing hydraulic oil in the wheel brake 4 to be discharged into the reservoir 63 through the solenoid valve 5 to reduce the braking pressure. The hydraulic oil discharged is sucked and pressurized by a pump 61 driven by a motor 62 so as to be returned to the line between the master cylinder 2 and the inlet port 31a.

When the solenoid valve 5 is deactivated in the state shown in FIG. 4C to increase the braking pressure, the spool 32 will perform metering action at its edge 32d, forming a restricted-flow channel connecting the inlet port 31a with the outlet port 31b through a passage 31d, an orifice 33, a pressure reducing chamber 36, the passage 31e and the annular groove 32a. The wheel braking pressure will rise slowly. When the pressure difference between the inlet port 31a and the outlet port 31b reduces to a certain level, the spool 3 will return to its original positon shown in FIG. 4A.

This arrangement is economical because each wheel can be controlled with a single solenoid valve. The flow rate of hydraulic oil through the orifice 33 is determined by the pressure difference at both ends thereof which is in turn determined by the effective sectional area of the spool 32 and the biasing force of the spring 34. When the pressure difference increases above the biasing force of the spring 34, the spool 32 will be moved to close the restricted-flow channel with its metering edge 32d. Thus the pressure difference at both ends of the orifice 33 can be limited to a minimum. This will not only serve to keep constant the flow rate through the orifice irrespective of the pressure difference between the inlet port 31a and the outlet port 31b, but also make it possible to reduce the flow rate through the orifice even if it has a rather large diameter. Thus this system can be advantageously applied to a compact car having a small-sized brake which has to be controlled with a small amount of hydraulic oil.

With this type of flow rate changeover valve, when the braking pressure is being reduced for antilock control, the spool is adapted to move to such a position as to bring the inlet 31a and the outlet 31b into communication with each other as shown in FIG. 4B and further move to the positon shown in FIG. 4C, where the outlet port 31b is brought into communication with the discharge port 31c. When increasing the braking pressure again in this state, the spool will move to open the restricted-flow channel through the orifice. If the spool is in a position between the position shown in FIG. 4B and the position shown in FIG. 4C, both the large-flow channel as well as the restricted-flow channel are closed up by the edge 32b and the 32c, respectively. If the spool should get stuck in this position owing to rust or foreign matter, it will become impossible to increase the braking pressure to the wheel brake 4 by increasing the pressure in the master cylinder 2.

This problem is not peculiar to a system having such a prior art flow rate changeover valve of the above-described type but is a common problem with any system having a spool adapted to shut off communication between an inlet and an outlet when it is in a position between its original position where a large-flow channel is formed between the inlet and the outlet and a position where a restricted-flow channel is formed to increase the braking presure again. Object And Brief Summary Of The Invention An object of the present invention is to provide a fluid pressure controller for antilock brake control which obviates the abovesaid shortcomings.

In accordance with the present invention, there is provided a fluid pressure controller for use in an antilock brake control device for a motor vehicle having a master cylinder and a wheel brake, the controller having a flow rate changeover valve comprising: a housing formed with an inlet port communicating with the master cylinder and an outlet port communicating with the wheel brake; a spool slidably mounted in the housing and formed with a passage and an orifice for changing over the communication between the inlet port and the outlet port; the spool being moved under fluid pressure between a first position where a large-flow passage is formed between the inlet port and the outlet port and a second position where a restricted-flow passage through the orifice is formed between the inlet port and the outlet port with the large-flow passage blocked; and a check valve provided in a passage in parallel with the restricted-flow passage and adapted to allow a fluid flow from the inlet port toward the outlet port to pass even if both of the large-flow passage and the restricted-flow passage are blocked.

According to the present invention, if the spool should get stuck at a position between its original position and the position for increasing the braking pressure again, hydraulic oil can be supplied through a check valve in the passage provided in parallel with the restricted-flow channel formed between the housing and the sleeve into the wheel brake to increase the braking pressure. The check valve serves to permit the fluid flow from the inlet toward the outlet but not the flow in a reverse direction.

During normal conditions, when the spool is free to slide, the time during which both the large-flow and restricted-flow channels are closed is so short that the check valve will not have any bad effect.

Also, by the provision of the check valve, the braking pressure can be reduced by reducing the pressure in the master cylinder and thus the inlet pressure even if the spool gets stuck. In normal conditions, the pressure at the inlet (pressure in the master cylinder) is always lower than the pressure at the outlet (braking pressure) and thus the check valve will not have any bad effect.

According to the present invention, even if the spool should get locked, at least minimum braking pressure required to ensure safety can be applied to the wheel brakes.

BRIEF DESCRIPTION OF THE DRAWINGS

Other features and objects of the present invention will become apparent from the following description taken with reference to the accompanying drawings, in which:

FIGS. 1A-1C are schematic views of the first embodiment in different conditions;

FIG. 3 is a schematic view of the third embodiment; and

DETAILED DESCRIPTION OF THE INVENTION

Figure 4A:
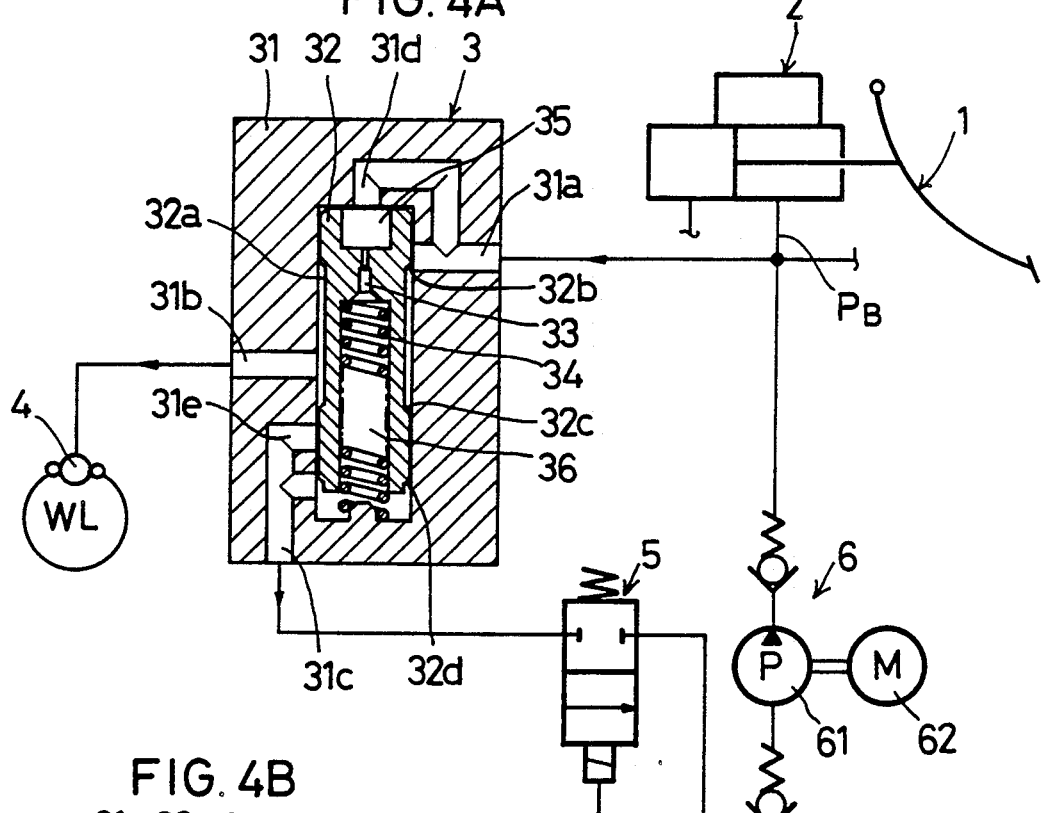
FIGS. 4A-4C are schematic views of a prior art fluid pressure controller in different conditions.
Figure 4B:
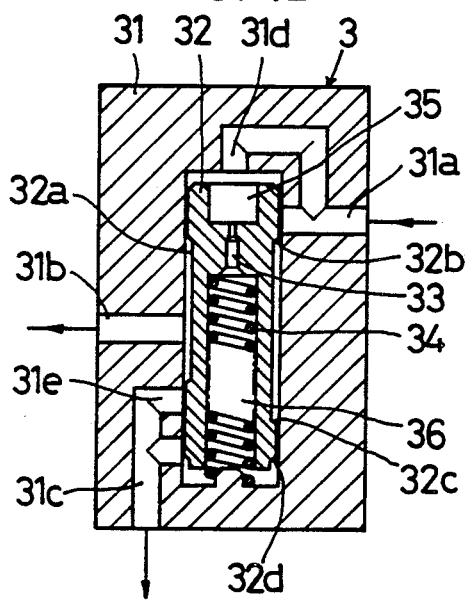
Figure 4C:
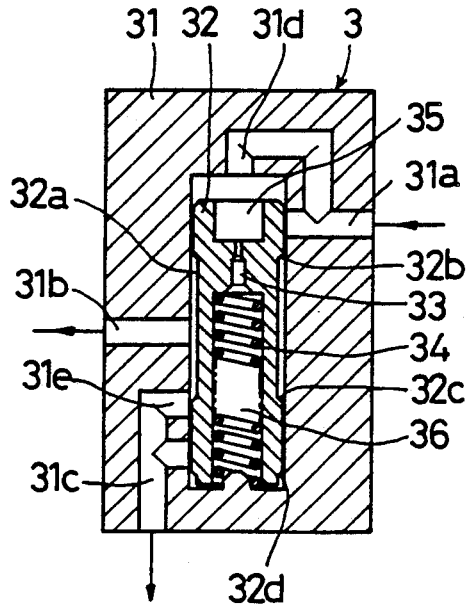

FIGS. 1A to 1C show the first embodiment which differs from the prior art controller shown in FIG. 4A in that the housing 31 is formed with a passage 31g and that a check valve 37 comprising a ball and a fixed valve seat 31h is provided in the passage 31g, which extends in parallel with the restricted-flow channel. In normal conditions, this valve operates in the same way as the prior art valve shown in FIG. 4A. Namely, while the valve is in the position shown in FIG. 1, where the antilock control is not activated, hydraulic oil does not flow through the orifice 33 but flows through the large-flow channel. The pressures at both sides of the check valve 37 are kept equal.

During the pressure reduction phase of antilock control, hydraulic oil will be discharged through the discharge port 31c. Thus the pressure in the pressure reducing chamber 36 and the passage 31f will drop and ball of the check valve will be pressed against the valve seat 31h. This state continues until the edge 32c is opened. When the spool 32 moves to the position shown in FIG. 1C, hydraulic oil will flow through the outlet port 31b, the groove 32a formed in the outer periphery of the spool 32, edge 32c and passage 31e so as to be discharged through the discharge port 31c. Now the pressures at both sides of the check valve 37 will become equal again.

If the spool 32 should get stuck in a position between the position shown in FIG. 1B and the position shown in FIG. 1C, though the restricted-flow channel extending from the inlet port 31a to the outlet port 31b through passage 31d, orifice 33, pressure reducing chamber 34, passage 31f and peripheral groove 32a is shut off by the edge portion 32c, hydraulic oil can flow through the passage 31g, pushing up the check valve 37, and to the outlet port 31b to apply pressure to the wheel brake 4.

Figure 2A:
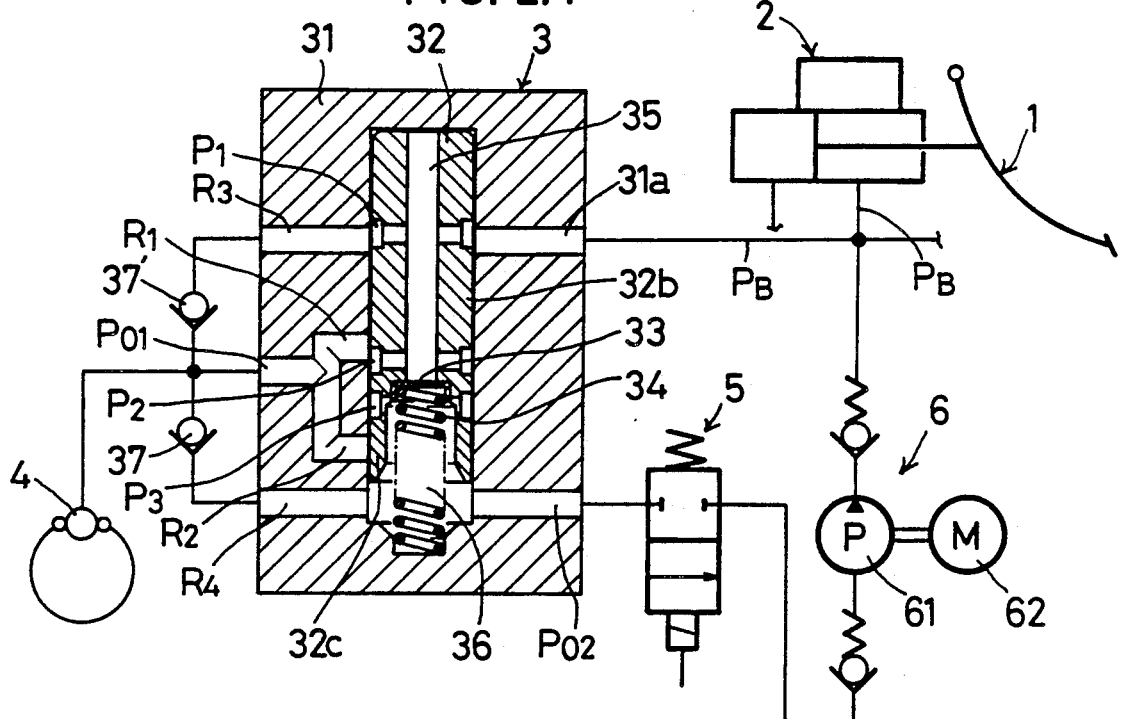
FIGS. 2A and 2B are schematic views of the second embodiment in different conditions.
Figure 2B:
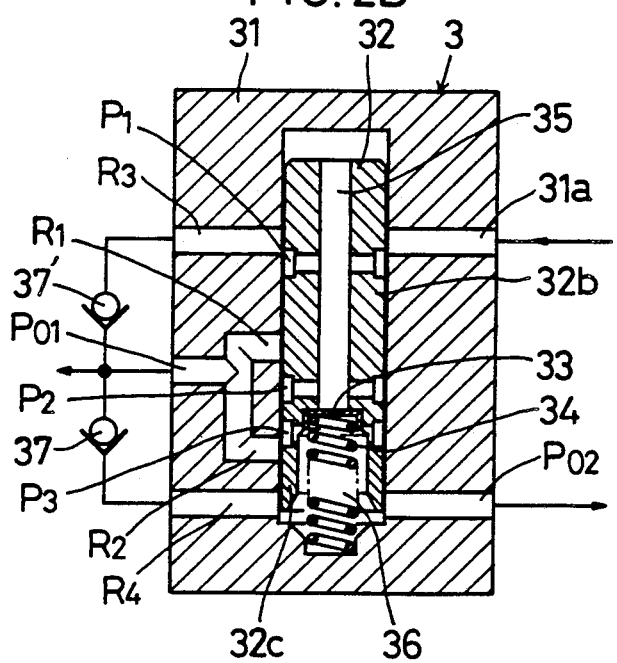

FIGS. 2A and 2B show the second embodiment which employs a flow rate changeover valve 3 of a different type from that of the first embodiment. Other parts are identical to those used in the first embodiment.

In this embodiment, the flow rate changeover valve 3 comprises a housing 31 formed with an inlet port 31a communicating with the master cylinder 2, a port P01 communicating with the wheel brake 4 and a port P02 communicating with the discharge line, and a spool 32 formed with channels for fluid communication and slidably mounted in the housing 31 so that the communications among the ports can be changed over. The spool 32 is biased by a spring 34 in one direction.

This flow rate changeover valve 3 has formed in its housing 31 with channels R3 and R4 and has provided in the lines leading from the respective channels R3 and R4 to the wheel brake 4 check valves 37 and 37', respectively, to assure reliable braking in case of emergency. In normal conditions, whether in the antilock control mode or not, these circuits are kept inoperative.

In the state shown in FIG. 2A, where the antilock control is not in action, a large-flow channel is formed extending from the inlet port 31a to the outlet port P01 through a passage P1, a pressure application chamber 35 and passages P2 and R1. To reduce the braking pressure during antilock control, the solenoid 5 is activated to open it and discharge hydraulic oil into the discharge line through the discharge port P02. As a result, the pressure in the pressure reducing chamber 6 will drop, creating a pressure difference between the chamber 6 and the pressure application chamber 35. This pressure difference will move the spool 32 to such a position that the large-flow channel is closed by its edge portion 32b. When the spool 32 further moves to the position shown in FIG. 2B, the edge 32c will be opened to form a channel connecting the outlet port P01 to the discharge port P02. The fluid pressure on the wheel brake 4 will drop.

When increasing the braking pressure again during antilock control, the solenoid valve 5 is turned off to close it. The spool 32 will remain in the position shown in FIG. 2B to perform metering action at its edge portion 32d. Thus a restricted-flow channel will be formed extending from the inlet port 31a to the outlet port P01 through passage P1, pressure application chamber 35, orifice 33, pressure reducing chamber 36 and passages P3 and R2. Owing to the pressure difference at both ends of the orifice 33, which is determined by the effective sectional area of the spool 32 and the biasing force of the spring 34, hydraulic oil will flow at a low rate through the orifice 33. When the braking pressure increases to such a level that the pressure difference between the inlet port 31a and the outlet port P01 falls below the pressure difference at both ends of the orifice 33, the spool 32 will be pushed up by the spring 34 to return to the position shown in FIG. 2A, where the largeflow channel opens again.

The inlet and outlet ports formed in the housing 31 and the passages formed in the spool 32 are arranged so that when the outlet P01 is shut off from the passage P2 by the edge portion 32b, the inlet port 31a communicates with the passage P1 while keeping the passage P3 out of communication with the outlet port P01, and so that when the spool 32 further descends to the position shown in FIG. 2B, the passage P3 communcates with the outlet port P01 and the inlet port 31a and the passage P1 communicate with each other through a small gap. The relative positions of the parts are determined so that the spool 32 will stop at this position with a balance established between the biassing force of the spring 34 and the force urging the spool 32 downwardly.

If the spool 32 should stick to the housing 31 and become immovable during antilock control at such a position that the edge portions 32b and 32c close the large-flow channel extending through the passages P2 and R1 in the spool 32 and the restricted-flow channel extending through the passage P3 and R2, no braking pressure can be supplied to the wheel brake through either of the above two channels.

But in this embodiment, the passage R4 branches off from the wide channel in parallel with the edge 32c adapted to close the narrow channel and the check valve 37 is provided in the line connecting the passage R4 with the wheel brake 4. With this arrangement, the braking pressure can be supplied to the wheel brake even if both the large-flow and restricted-flow channels are closed.

The solenoid valve 5 is supposed to be closed in such an emergency situation. When the brake pedal is relaxed in this state, the hydraulic oil in the wheel brake 4 will return to the master cylinder 5 through the other check valve 37', the passage R3 and the inlet port 31a.

Since the third embodiment has the same fluid pressure control system as the other embodiments, FIG. 3 shows only a flow rate changeover valve 3 for simplification. It has essentially the same construction as the valve in the second embodiment (FIG. 2A) and differs therefrom only in that a sleeve 38 is provided between the housing 31 and the spool 32, that the solenoid valve 5 is integral with the valve 3, and that check valves have a different construction from those in the second embodiment. The function of check valves is completely the same as the second embodiment.

In this embodiment, cup seals which serve as the check valves 37 and 37' are fitted in annular grooves formed in the outer periphery of the sleeve 38. Other annular grooves R0 and R4 serve as channels for the check valves 37 and 37'

Even if the spool 32 should get stuck before reaching the position for re-pressurization shown in FIG. 2B and when the edge portions 32b and 32c are both closed, hydraulic oil will flow through inlet port 31a, passage P1, pressure application chamber 35, orifice 33, pressure reducing chamber 36 and a passage R4 formed in parallel with the edge portion, forcing through the cup seal 37 and flowing through the annular groove R0 and the outlet port P01 into the wheel brake 4. When the brake pedal is relaxed in this state, the hydraulic oil in the wheel brake 4 will flow through the annular groove R0, the passage R1 and a restricted hole 38a, pushing through the cup seal 37' to return to the master cylinder 2 through the inlet port 31a.

What is claimed is:

1. A fluid pressure controller for use in an antilock brake control device for a motor vehicle having a master cylinder and a wheel brake, said controller having a flow rate changeover valve comprising:

a housing having an inlet port for communicating with the master cylinder and an outlet port for communicating with the wheel brake;

a sleeve mounted in said housing and having passages communicating with said inlet port and said outlet port;

a spool slidably mounted in said sleeve and having a large flow passage which in a first position of said spool forms a large-flow passage between said inlet port and said outlet port, and an orifice which in a second position of said spool forms a restricted-flow passage through said orifice between said inlet port and said outlet port, said spool being movable under fluid pressure between said first and second positions; and said fluid pressure controller having a further passage in parallel with said restricted-flow passage and formed at least in part by a space between said sleeve and said housing and a check valve means in said further passage constituted by a cup seal between said sleeve and said body.

2. A fluid pressure controller as claimed in claim 1 further comprising a spring urging said spool in one direction.

* * * * *

UNITED STATES PATENT AND TRADEMARK OFFICE
CERTIFICATE OF CORRECTION

PATENT NO. : 5,002,344

DATED : Mar. 26, 1991

INVENTOR(S) : Atsuo Matsumoto; Teruhisa Kohno; Seiji Nokubo; Hideaki Higashimura; and Koichi Hashida It is certified that error appears in the above-identified patent and that said Letters Patent is hereby corrected as shown below:

On the title page, under item [19], "Hashida" should be --Matsumoto--; and item [75], should read as follows:

--Atsuo Matsumoto; Teruhisa Kohno; Seiji Nokubo; Hideaki Higashimura; and Koichi Hashida, all of Hyogo, Japan--.

Signed and Sealed this

Tenth Day of December, 1991

Attest:

HARRY F. MANBECK, JR.

*Attesting Officer*　　　*Commissioner of Patents and Trademarks*